(12) United States Patent
Hecht (10) Patent No.: US 11,453,070 B2
(45) Date of Patent: Sep. 27, 2022

(54) ROTATABLE CUTTING HEAD HAVING TORQUE TRANSMISSION SURFACES ON A MOUNTING PROTUBERANCE AND ROTARY CUTTING TOOL

(71) Applicant: Iscar, Ltd., Tefen (IL)

(72) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 219 days.

(21) Appl. No.: 16/880,218

(22) Filed: May 21, 2020

(65) Prior Publication Data
US 2021/0362244 A1    Nov. 25, 2021

(51) Int. Cl.
*B23B 51/02* (2006.01)
*B23B 27/14* (2006.01)

(52) U.S. Cl.
CPC .............. *B23B 51/02* (2013.01); *B23B 27/14* (2013.01); *B23B 2251/02* (2013.01); *B23B 2251/408* (2013.01)

(58) Field of Classification Search
CPC ................ B23B 27/14; B23B 2251/02; B23B 2251/408; B23B 2210/02; B23B 51/02; B23B 2251/50; Y10T 408/9098; B23C 2210/02; B23D 2277/02
See application file for complete search history.

(56) References Cited

U.S. PATENT DOCUMENTS

| | | | |
|---|---|---|---|
| 5,800,098 A * | 9/1998 | Satran | ................... B23B 31/008 407/31 |
| 5,957,631 A | 9/1999 | Hecht | |
| 6,109,841 A | 8/2000 | Johne | |
| 6,276,879 B1 | 8/2001 | Hecht | |
| 6,582,164 B1 | 6/2003 | McCormick | |
| 7,309,196 B2 | 12/2007 | Ruy Frota de Souza | |
| 7,360,974 B2 | 4/2008 | Borschert et al. | |
| 7,377,730 B2 | 5/2008 | Hecht et al. | |

(Continued)

FOREIGN PATENT DOCUMENTS

| | | | | |
|---|---|---|---|---|
| DE | 102014206796 A1 | * | 10/2015 | ............. B23B 51/02 |
| DE | 102015211744 A1 | * | 12/2016 | ............. B23B 51/02 |

(Continued)

*Primary Examiner* — Eric A. Gates
*Assistant Examiner* — Paul M Janeski
(74) *Attorney, Agent, or Firm* — Womble Bond Dickinson (US) LLP (57) ABSTRACT

A cutting head rotatable about a head axis has a cap portion and a mounting protuberance joined thereto. The cap portion has N cutting portions circumferentially alternating with N head flutes. The mounting protuberance has N circumferentially spaced apart engagement portions, each including a radially outward facing clamping surface and a torque transmission surface. In a cross-section taken in a head plane perpendicular to the head axis, a first imaginary circle having a first diameter circumscribes the N clamping surfaces, and N radially outermost torque points of the N torque transmission surfaces define a second imaginary circle having a second diameter. The second diameter is greater than ninety percent of the first diameter. A rotary cutting tool includes a tool shank extending along a shank axis and a head receiving pocket at a forward end thereof, and the cutting head is releasably secured in the head receiving pocket.

21 Claims, 6 Drawing Sheets

(56) References Cited

U.S. PATENT DOCUMENTS

| | | | |
|---|---|---|---|
| 7,467,915 B2 | 12/2008 | de Souza, Filho | |
| 7,972,094 B2 | 7/2011 | Men et al. | |
| 8,021,088 B2 | 9/2011 | Hecht | |
| 8,534,966 B2 | 9/2013 | Hecht | |
| 8,556,552 B2 | 10/2013 | Hecht | |
| 8,992,141 B2 | 3/2015 | Hecht et al. | |
| 8,992,142 B2 | 3/2015 | Hecht | |
| 9,028,180 B2 | 5/2015 | Hecht | |
| 10,071,430 B2 | 9/2018 | Frota De Souza Filho et al. | |
| 2009/0116920 A1 | 5/2009 | Bae | |
| 2012/0315101 A1 | 12/2012 | Osawa et al. | |
| 2014/0169892 A1 | 6/2014 | Hecht | |
| 2014/0301799 A1* | 10/2014 | Schwaegerl | B23B 51/02 408/239 R |
| 2015/0266107 A1 | 9/2015 | Gonen et al. | |
| 2016/0263663 A1* | 9/2016 | Schwaegerl | B24B 3/26 |
| 2016/0375499 A1* | 12/2016 | Jäger | B23B 51/02 408/199 |
| 2017/0028480 A1* | 2/2017 | Schwägerl | B23B 51/02 |
| 2017/0100784 A1 | 4/2017 | Frota De Souza Filho et al. | |
| 2017/0113282 A1 | 4/2017 | Zeug et al. | |
| 2018/0065191 A1 | 3/2018 | Hecht | |
| 2020/0206826 A1 | 7/2020 | Shitrit | |

FOREIGN PATENT DOCUMENTS

| | | | | |
|---|---|---|---|---|
| JP | 2006167871 A | * | 6/2006 | |
| WO | WO-9627469 A1 | * | 9/1996 | B23B 31/008 |

* cited by examiner

ROTATABLE CUTTING HEAD HAVING TORQUE TRANSMISSION SURFACES ON A MOUNTING PROTUBERANCE AND ROTARY CUTTING TOOL

FIELD OF THE INVENTION

The present invention relates to a rotatable cutting head having torque transmission surfaces on a mounting protuberance and a rotary cutting tool having such cutting head, for use in metal cutting processes in general, and for drilling operations in particular.

BACKGROUND OF THE INVENTION

Within the field of cutting tools used in drilling operations, there are some examples of rotary cutting tools with cutting heads having torque transmission surfaces on a mounting protuberance.

U.S. Pat. No. 6,582,164 discloses a removable tip having a front end and a rear end. The front end has two cutting portions circumferentially alternating with a two chip flutes, and the rear end is defined by a shaft, adapted to be inserted in the connection bore of a drill body, and having diametrically opposed external threads extending therefrom. Each external thread has a diminishing radius defining a drive face which cooperates with the drive face of a corresponding internal thread of the drill body, for transmitting rotational forces between the drill body and the removable tip.

U.S. Pat. No. 10,071,430 discloses a cutting head formed for insertion into a support in a modular rotary tool. The cutting head has a coupling pin having torque surfaces and clamping surfaces on its outer periphery. The coupling pin is divided into a front pin part and a rear pin part. The front pin part is defined by a circumferential groove. Stop surfaces for an axial pullout safety are formed in the transition area between the two the front pin part and the rear pin part. The torque surfaces and the clamping surfaces are arranged in different pin parts. The clamping surfaces are preferably formed on the front pin part and the torque surfaces are preferably formed in the rear pin part.

It is an object of the present invention to provide an improved rotatable cutting head rotatable having torque transmission surfaces on a mounting protuberance.

It is also an object of the present invention to provide an improved rotatable cutting head, configured for a high level of torque transfer between a tool shank and the mounting protuberance.

It is a further object of the present invention to provide an improved rotary cutting tool, configured for efficient and optimized torque transfer between the tool shank and the rotatable cutting head.

SUMMARY OF THE INVENTION

In accordance with the present invention, there is provided a cutting head rotatable about a head axis in a direction of cutting rotation, the head axis establishing an axial forward direction and an axial rearward direction, comprising:
a cap portion having N cutting portions circumferentially alternating with N head flutes and a cap base surface facing in the axial rearward direction; and
a mounting protuberance joined to the cap portion, extending axially rearwardly from the cap base surface, and having:
a mounting end surface distal from the cap portion, facing in the axial rearward direction, and
N circumferentially spaced apart engagement portions,
each engagement portion including a radially outward facing clamping surface, and
a torque transmission surface facing opposite the direction of cutting rotation,
wherein:
N is an integer greater than 1, and
in a cross-section taken in a first head plane perpendicular to the head axis, intersecting the N engagement portions and passing through the N clamping surfaces and the N torque transmission surfaces:
a first imaginary circle centered about the head axis and having a first diameter circumscribes the N clamping surfaces,
a second imaginary circle centered about the head axis and having a second diameter, is defined by N radially outermost torque points of the N torque transmission surfaces, and
the second diameter is greater than ninety percent and less than one hundred percent of the first diameter.

Also, in accordance with the present invention, there is provided a rotary cutting tool comprising, in combination:
a tool shank extending along a shank axis and having a head receiving pocket at a forward end thereof, and
a cutting head of the sort described above, releasably secured to the head receiving pocket, in an assembled position of the tool.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

A first aspect of the present invention relates to a cutting head 20 rotatable about a head axis AH in a direction of cutting rotation RC.

The head axis AH establishes an axial forward direction DF and an axial rearward direction DR.

In some embodiments of the present invention, the cutting head 20 may preferably be manufactured by form pressing and sintering a cemented carbide, such as tungsten carbide, and may be coated or uncoated.

The cutting head 20 comprises a cap portion 22, and a mounting protuberance 24 joined to the cap portion 22.

As shown in FIGS. 1 to 5, the cap portion 22 has N cutting portions 26 circumferentially alternating with N head flutes 28, and a cap base surface 30 facing in the axial rearward direction DR.

It should be appreciated throughout the description and claims, that N is a specific integer number greater than one, and thus the plurality of head flutes 28 are equal in number to the plurality of cutting portions 26.

Figure 3:
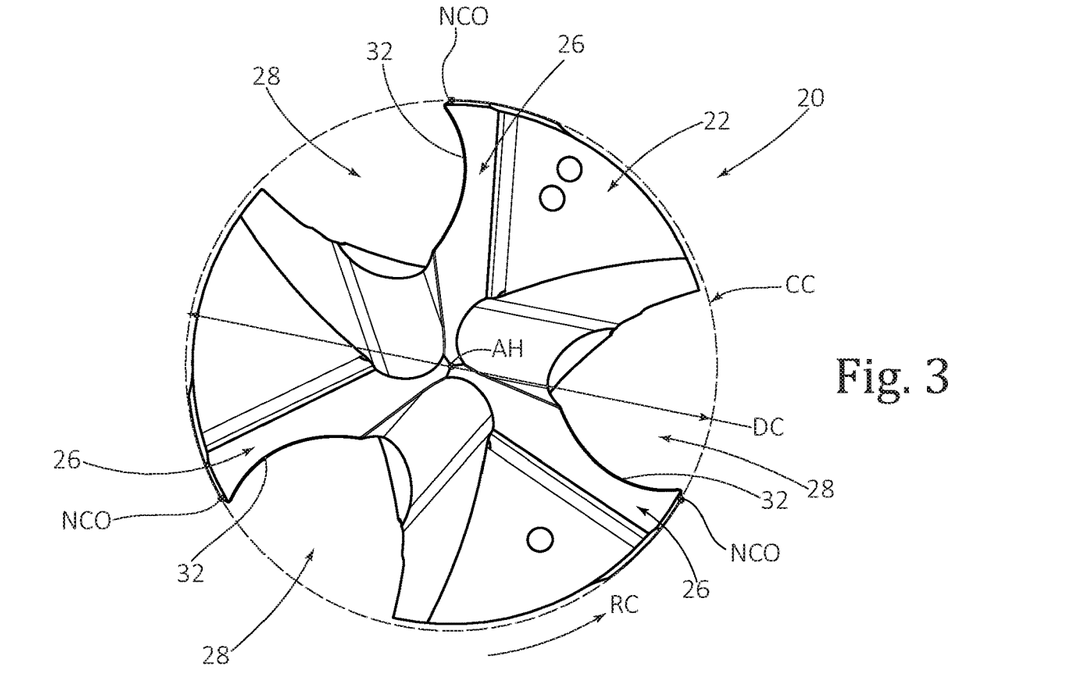
FIG. 3 is a front view of the cutting head shown in FIGS. 1 and 2.

As shown in FIG. 3, each cutting portion 26 may have a radially extending cutting edge 32, and N radially outermost cutting points NCO of the N radially extending cutting edges 32 may define an imaginary cutting circle CC having a cutting diameter DC.

In some embodiments of the present invention, it should be appreciated that the imaginary cutting circle CC may have a center coincident with the head axis AH.

Also, in some embodiments of the present invention, the cutting head 20 may be used for drilling operations. Thus, the cutting head 20 can be a drill head with radially extending cutting edges 32 also extending in the axial rearward direction DR.

Further, in some embodiments of the present invention, the cutting head 20 may exhibit N-fold rotational symmetry about the head axis AH.

As shown in FIGS. 1 to 5, the mounting protuberance 24 extends axially rearwardly from the cap base surface 30 and includes N circumferentially spaced apart engagement portions 34.

It should be appreciated that the N engagement portions 34 are equal in number to the N cutting portions 26.

In some embodiments of the present invention, the cap base surface 30 may be perpendicular to the head axis AH.

Also, in some embodiments of the present invention, the cap base surface 30 may comprise N circumferentially spaced apart co-planar cap base sub-surfaces 30a.

The mounting protuberance 24 also includes a mounting end surface 36 distal from the cap portion 22, facing in the axial rearward direction DR.

In some embodiments of the present invention, the N head flutes 28 may extend axially rearwardly from the cap portion 22 and intersect the mounting end surface 36, and the plurality of N engagement portions 34 may circumferentially alternate with the N head flutes 28.

Also, in some embodiments of the present invention, the mounting end surface 36 may be planar.

Figure 5:
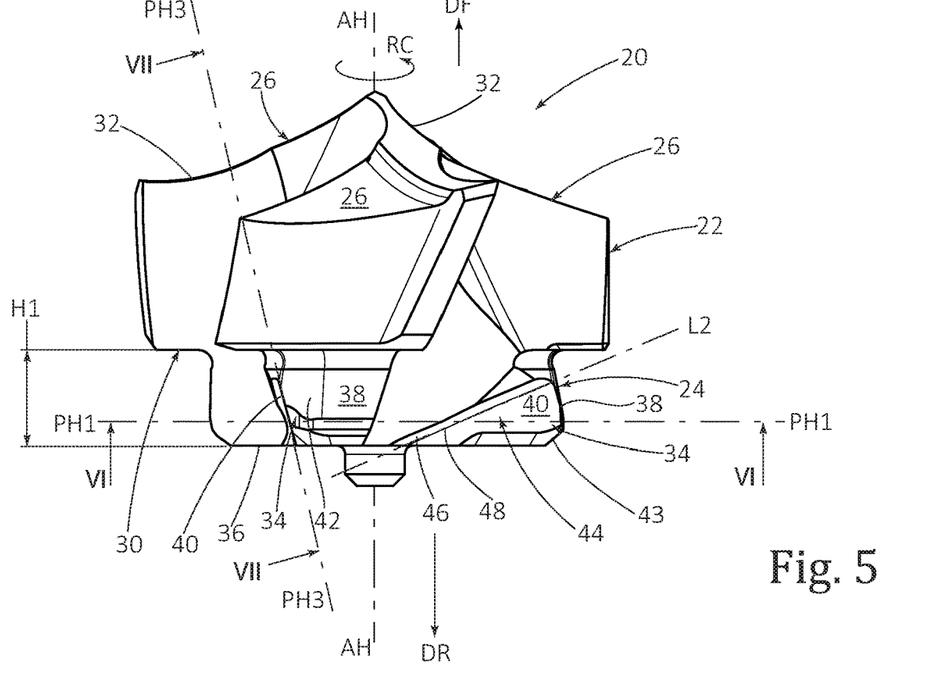
FIG. 5 is a side view of the cutting head shown in FIGS. 1 and 2.

Further, in some embodiments of the present invention, as shown in FIG. 5, the mounting end surface 36 may be axially spaced apart from the cap base surface 30 by a first height H1, and the first height H1 may be less than thirty percent of the cutting diameter DC, i.e. $H1<0.30*DC$.

For embodiments of the present invention, in which the first height H1 is less than thirty percent of the cutting diameter DC, the mounting protuberance 24 may be considered axially compact, and the cutting head 20 may be advantageously manufactured from a reduced amount of cemented carbide.

As shown in FIGS. 1 to 5, each engagement portion 34 has a radially outward facing clamping surface 38, and a torque transmission surface 40 facing opposite the direction of cutting rotation RC. In the mounting protuberance 24, the clamping surfaces 38 and the torque transmission surfaces 40 overlap in the axial direction (i.e., along the head axis AH).

In some embodiments of the present invention, with respect to the direction of cutting rotation RC, each clamping surface 38 may be located rotationally ahead of its associated torque transmission surface 40.

Also, in some embodiments of the present invention, the clamping surface 38 and the torque transmission surface 40 of each engagement portion 34 may be circumferentially spaced apart by a corner surface 42.

Further, in some embodiments of the present invention, as shown in FIG. 5, the N clamping surfaces 38 may taper in the axial forward direction DF.

Yet further, in some embodiments of the present invention, each clamping surface 38 may not intersect the mounting end surface 36.

Figure 1:
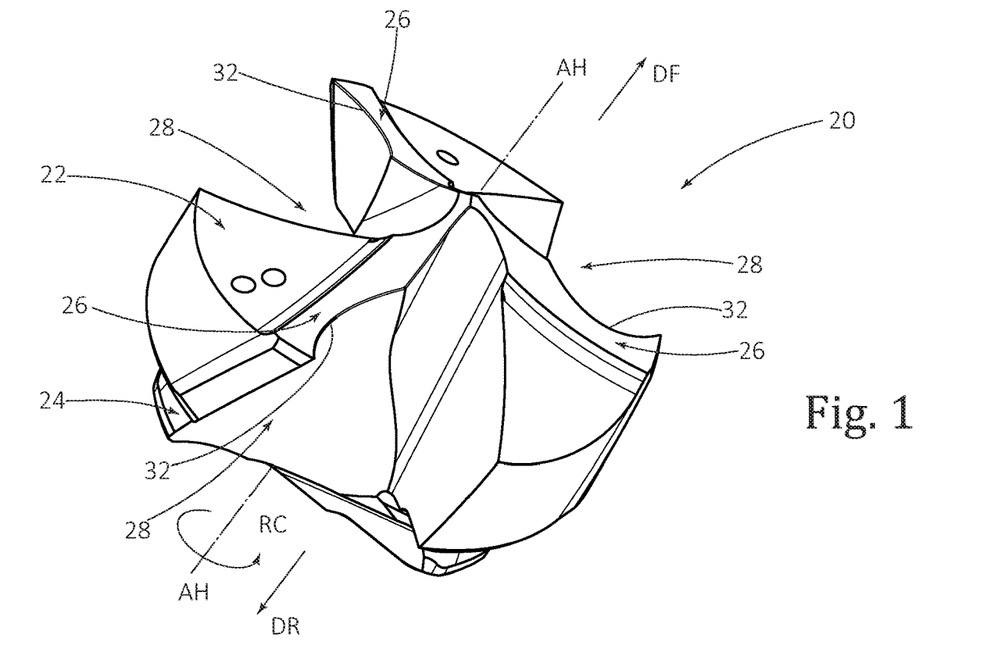
FIG. 1 is a first perspective view of a cutting head in accordance with some embodiments of the present invention.
Figure 2:
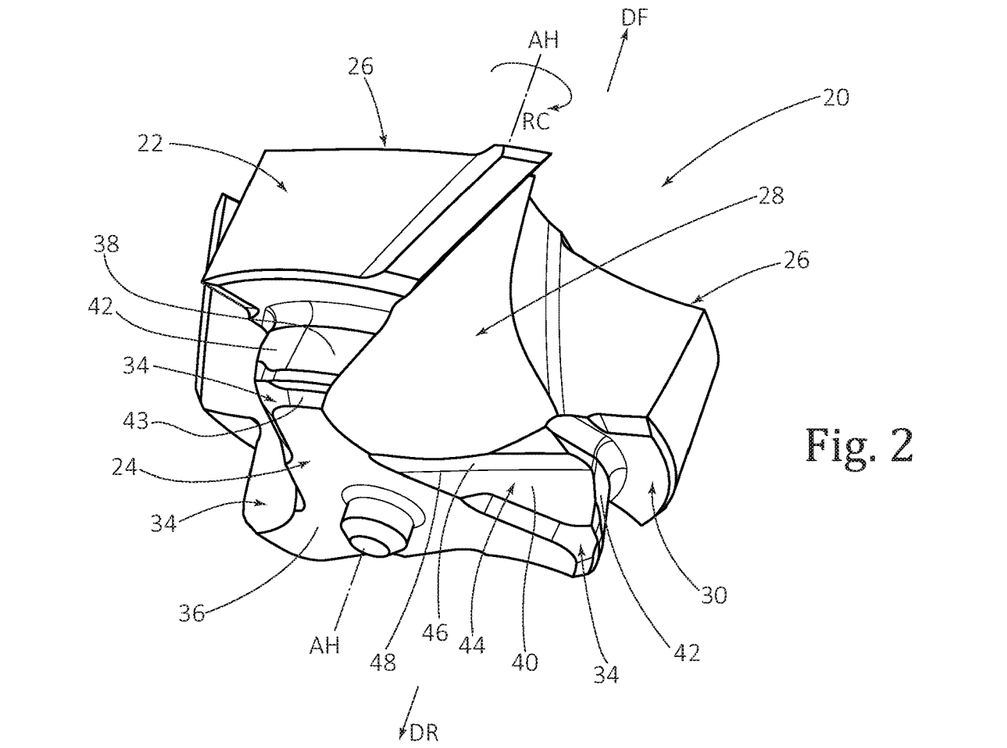
FIG. 2 is a second perspective view of the cutting head in accordance with some embodiments of the present invention.
Figure 4:
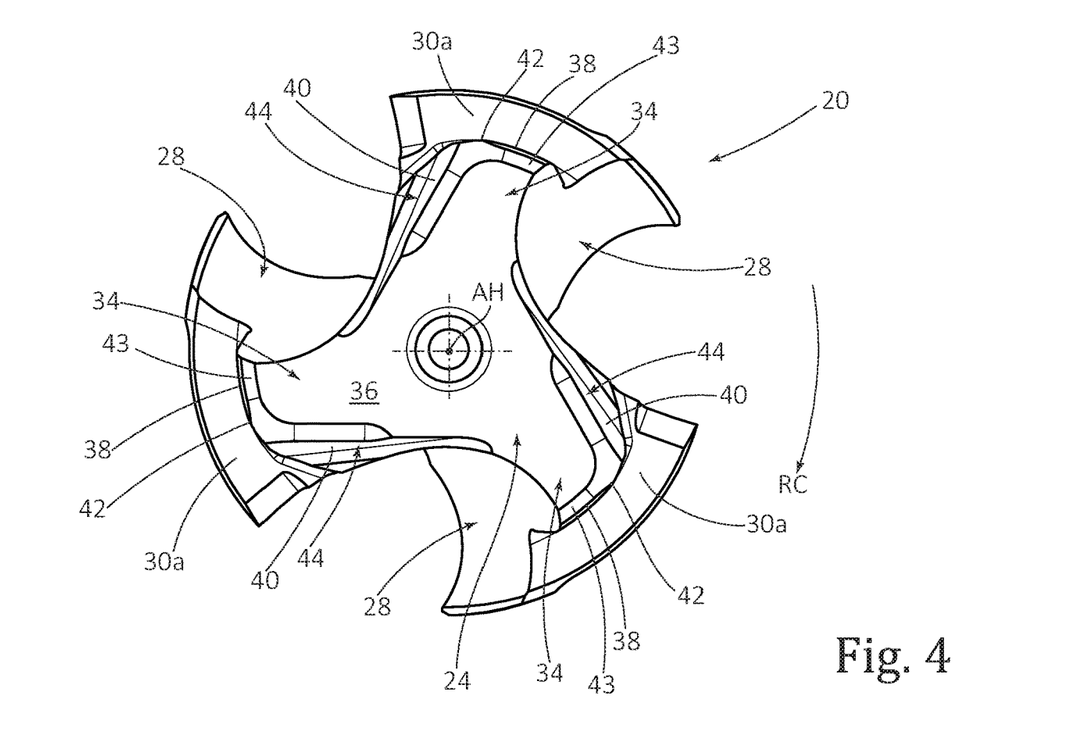
FIG. 4 is a rear view of the cutting head shown in FIGS. 1 and 2.

As shown in FIGS. 2, 4 and 5, each engagement portion 34 may include an end chamfer 43, and each clamping surface 38 may be spaced apart from the mounting end surface 36 by its associated end chamfer 43.

By configuring the N torque transmission surfaces 40 to be disposed on the mounting protuberance 24, as opposed to the cap portion 22, advantageously allows the cutting portions 26 to be arranged in an optimized manner, for example, with respect to cutting chip development and cutting chip flow, without the requirement to provide additional space for torque transfer between a tool shank and the cutting head's cap portion 22.

It should be appreciated that the significance of arranging the cutting portions 26 in an optimized manner is greater for cap portions 22 having smaller cutting diameters, and for cutting heads 20 having a value of N which is greater than two, i.e. $N>2$.

Figure 6:
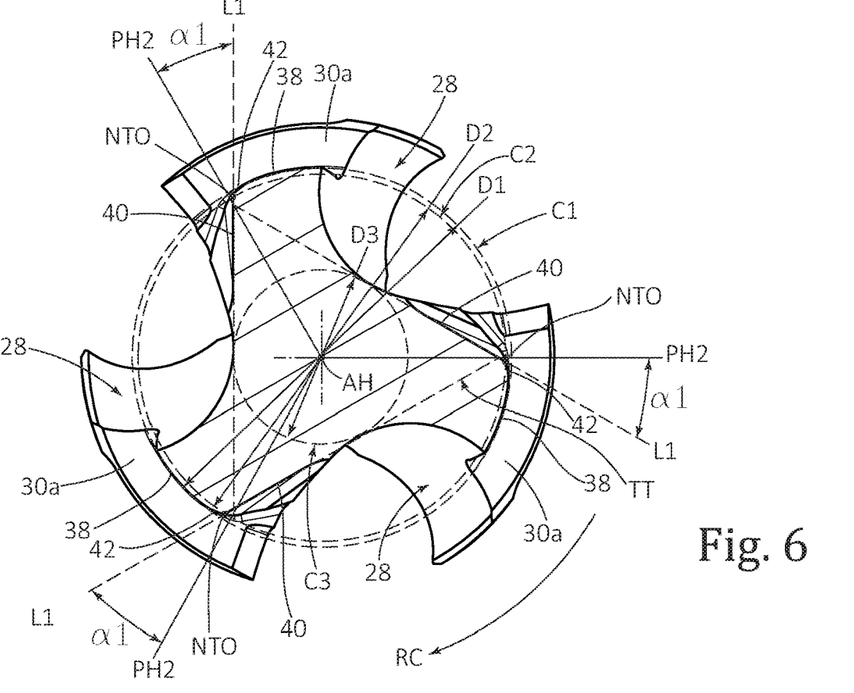
FIG. 6 is a cross-sectional view of the cutting head shown in FIG. 5, taken along the line VI-VI.

As shown in FIG. 6, in a cross-section taken in a first head plane PH1 perpendicular to the head axis AH, intersecting the N engagement portions 34, and passing through both the clamping surfaces 38 and the torque transmission surfaces 40, a first imaginary circle C1 having a first diameter D1 circumscribes the N clamping surfaces 38.

In some embodiments of the present invention, in the cross-section taken in the first head plane PH1, each clamping surface 38 may lie on the first imaginary circle C1.

Also, in some embodiments of the present invention, the first diameter D1 may be greater than seventy percent of the cutting diameter DC, i.e. $D1>0.70*DC$.

Further, in some embodiments of the present invention, it should be appreciated that the first imaginary circle C1 may have a center coincident with the head axis AH.

As shown in FIG. 6, in the cross-section taken in the first head plane PH1, N radially outermost torque points NTO of the N torque transmission surfaces 40 define a second imaginary circle C2 having a second diameter D2.

It should be appreciated throughout the description and claims, that the N radially outermost torque points NTO may not be the absolute radially outermost torque points of the N torque transmission surfaces 40, but the radially outermost torque points of the N torque transmission surfaces 40 in the first head plane PH1.

In some embodiments of the present invention, it should be appreciated that the second imaginary circle C2 may have a center coincident with the head axis AH.

According to the first aspect of the present invention, the second diameter D2 is greater than ninety percent and less than one hundred percent of the first diameter D1, i.e. 0.90*D1<D2<1.00*D1.

In some embodiments of the present invention, the second diameter D2 may be greater than ninety-five percent and less than one hundred percent of the first diameter D1, i.e. 0.95*D1<D2<1.00*D1.

It should be appreciated that configuring the N torque transmission surfaces 40 such that the second diameter D2 is greater than ninety percent of the first diameter D1, advantageously enables a high level of torque transfer between a tool shank and the mounting protuberance 24.

It should be also appreciated that for embodiments of the present invention in which the first diameter D1 is greater than seventy percent of the cutting diameter DC, a high level of torque transfer can be further ensured.

As shown in FIG. 6, in the cross-section taken in the first head plane PH1, each corner surface 42 may be convexly curved, and tangentially adjoin its associated clamping surface 38.

Also, as shown in FIG. 6, in the cross-section taken in the first head plane PH1, each torque transmission surface 40 may extend linearly from its respective radially outermost torque point NTO and define a first imaginary straight line L1.

In some embodiments of the present invention, as shown in FIG. 6, each first imaginary straight line L1 may pass through another portion of the mounting protuberance 24.

Also, in some embodiments of the present invention, each torque transmission surface 40 may be planar.

As shown in FIG. 6, each radially outermost torque point NTO may be contained in a second head plane PH2 containing the head axis AH.

Also, as shown in FIG. 6, in the cross-section taken in the first head plane PH1, each first imaginary straight line L1 may form a first angle α1 with its associated second head plane PH2.

In some embodiments of the present invention, the first angle α1 may be less than thirty-five degrees, i.e. α1<35°.

It should be appreciated that for embodiments of the present invention in which the first angle α1 is less than thirty-five degrees, the N torque transmission surfaces 40 are advantageously oriented so that torque transfer between a tool shank and the mounting protuberance 24 can occur efficiently.

As shown in FIG. 1 to 5, N may equal three, i.e. N=3, and as shown in FIG. 6, in the cross-section taken in the first head plane PH1, the plurality of N torque transmission surfaces 40 may define an imaginary torque triangle TT.

In some embodiments of the present invention, as shown in FIG. 6, the N radially outermost torque points NTO of the N torque transmission surfaces 40 may be located outside imaginary torque triangle TT.

Also, in some embodiments of the present invention, a third imaginary circle C3 having a third diameter D3 may inscribe the torque triangle TT, and the third diameter D3 may be less than sixty percent of the first diameter D1, i.e. D3<0.60*D1.

It should be appreciated that for embodiments of the present invention in which the third diameter D3 is less than sixty percent of the first diameter D1, the N torque transmission surfaces 40 are advantageously oriented so that torque transfer between a tool shank and the mounting protuberance 24 can occur efficiently.

In some embodiments of the present invention, the N torque transmission surfaces 40 may be outwardly inclined in the axial forward direction DF, such that as shown in FIG. 6, the portions of the N torque transmission surfaces 40 axially forward of the first head plane PH1 are located outside of the torque triangle TT.

It should be appreciated that for embodiments of the present invention in which the N torque transmission surfaces 40 are outwardly inclined in the axial forward direction DF, the N engagement portions 34 may be highly robust.

As shown in FIG. 1 to 5, each torque surface 40 may be formed in a torque cut-out 44 of its respective engagement portion 34.

In some embodiments of the present invention, each torque transmission surface 40 may intersect an adjacent joining surface 46 to form a straight torque border edge 48.

As shown in FIG. 5, each torque transmission surface 40 may define a third head plane PH3, and each third head plane PH3 may intersect the mounting protuberance 24 along its associated torque border edge 48.

In some embodiments of the present invention, each joining surface 46 may intersect one of the head flutes 28.

Figure 7:
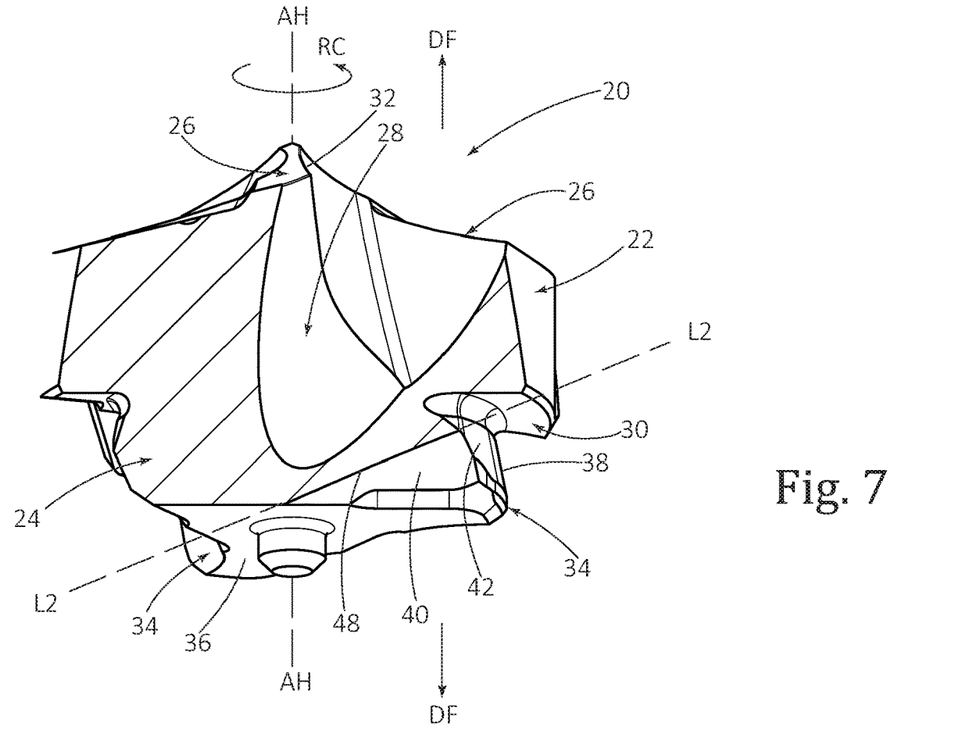
FIG. 7 is a cross-sectional view of the cutting head shown in FIG. 5, taken along the line VII-VII.

As shown in FIG. 7, each torque border edge 48 defines a second imaginary straight line L2 which may not intersect or pass through any other portion of the mounting protuberance 24.

Also, as shown in FIG. 7, apart from each second imaginary second straight line L2 being coincident with its respective torque border edge 48, each second imaginary straight line L2 may not intersect or pass through any other portion of the cutting head 20. This can be appreciated by observing in FIG. 7 that neither of the two portions of the second imaginary straight line L2 extending from the ends of the torque border edge 48 overlap the 'cut' or 'hatched' portion of the cutting head 20.

In some embodiments of the present invention, as shown in FIG. 5, each second imaginary straight line L2 may intersect the first head plane PH1.

Also, in some embodiments of the present invention, as shown in FIG. 5, each torque border edge 48 may intersect the first head plane PH1.

Further, in some embodiments of the present invention, as shown in FIGS. 5 and 7, each torque border edge 48 may intersect the mounting end surface 36.

It should be appreciated that for embodiments of the present invention in which apart from being coincident with its respective torque border edge 48, each second imaginary straight line L2 does not intersect or pass through any other portion of the cutting head 20, the associated torque transmission surface 40 may be formed by means of a grinding operation, whereby sufficient clearance is provided for a large diameter grinding wheel typically used to perform such grinding operation.

It should also be appreciated that the N torque transmission surfaces 40 may be highly accurate following a grinding operation.

For such embodiments of the present invention, the mounting protuberance 24 may be configured such that the first imaginary straight line L1 associated with each torque transmission surface 40 passes through another portion of the mounting protuberance 24, for example, embodiments in which N=3.

As shown in FIGS. 8 to 12, a second aspect of the present invention relates to a rotary cutting tool 50 having, in combination, a tool shank 52 extending along a shank axis AS and having a head receiving pocket 54 at a forward end 56 thereof, and the cutting head 20 releasably secured to the head receiving pocket 54, in an assembled position of the tool.

In some embodiments of the present invention, the tool shank 52 may preferably be manufactured from tool steel.

Also, in some embodiments of the present invention, the rotary cutting tool 50 may be used for drilling operations. As seen in these figures, the cutting tool 50 is a drill 50 comprising a drill head 20 and a drill shank 52.

Further, in some embodiments the cutting head 20 may be releasably secured to the head receiving pocket 54 without the requirement of an additional fastening member, such as a clamping screw.

Figure 9:
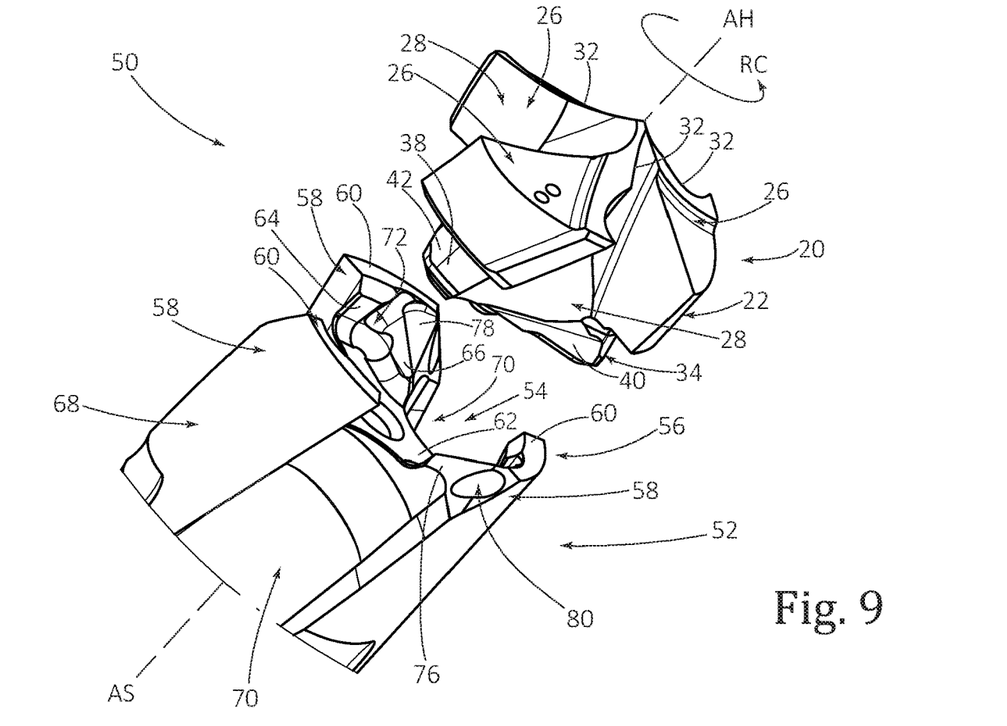
FIG. 9 is an exploded perspective view of the rotary cutting tool shown in FIG. 8.
Figure 12:
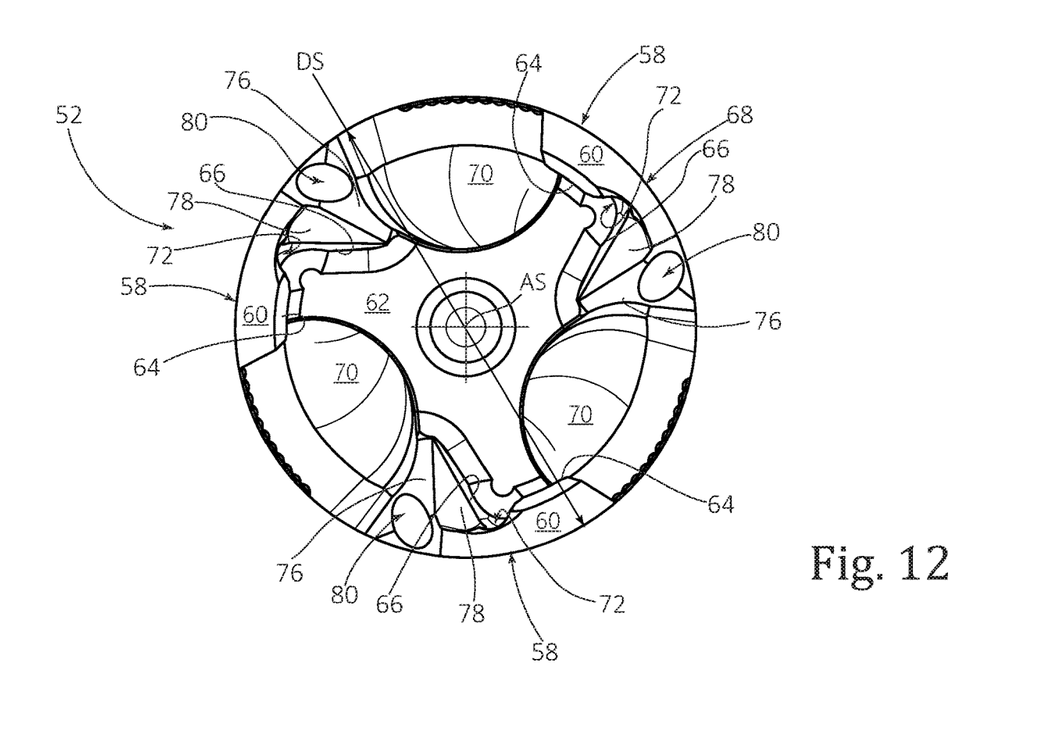
FIG. 12 is a front view of a tool shank in accordance with some embodiments of the present invention.

As shown in FIGS. 9 and 12, the head receiving pocket 54 may include N circumferentially spaced apart fixation portions 58, and each fixation portion 58 may have an axially forward-facing shank support surface 60.

In some embodiments of the present invention, the N shank support surfaces 60 may be co-planar.

Also, in some embodiments of the present invention, the N shank support surfaces 60 may be perpendicular to the shank axis AS.

Figure 10:
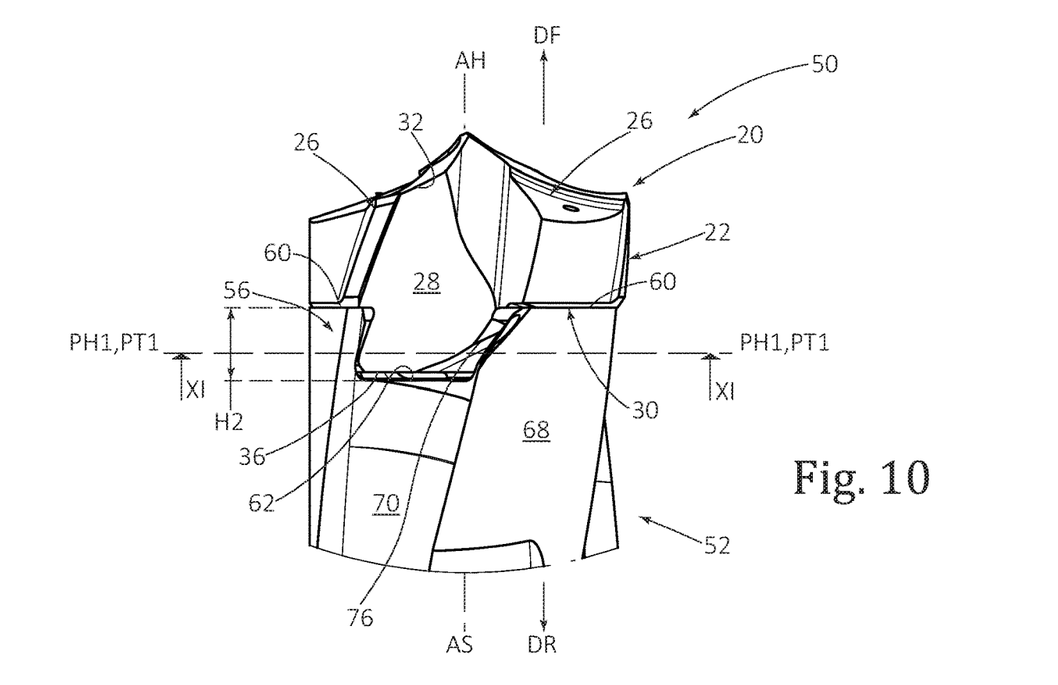
FIG. 10 is a side view of the rotary cutting tool shown in FIG. 8.

As shown in FIGS. 9 and 10, the head receiving pocket 54 may have an axially forward-facing bottom surface 62, and the bottom surface 62 may be axially spaced apart from the N shank support surfaces 60 by a second height H2.

In some embodiments of the present invention, the bottom surface 62 may be planar.

Figure 8:
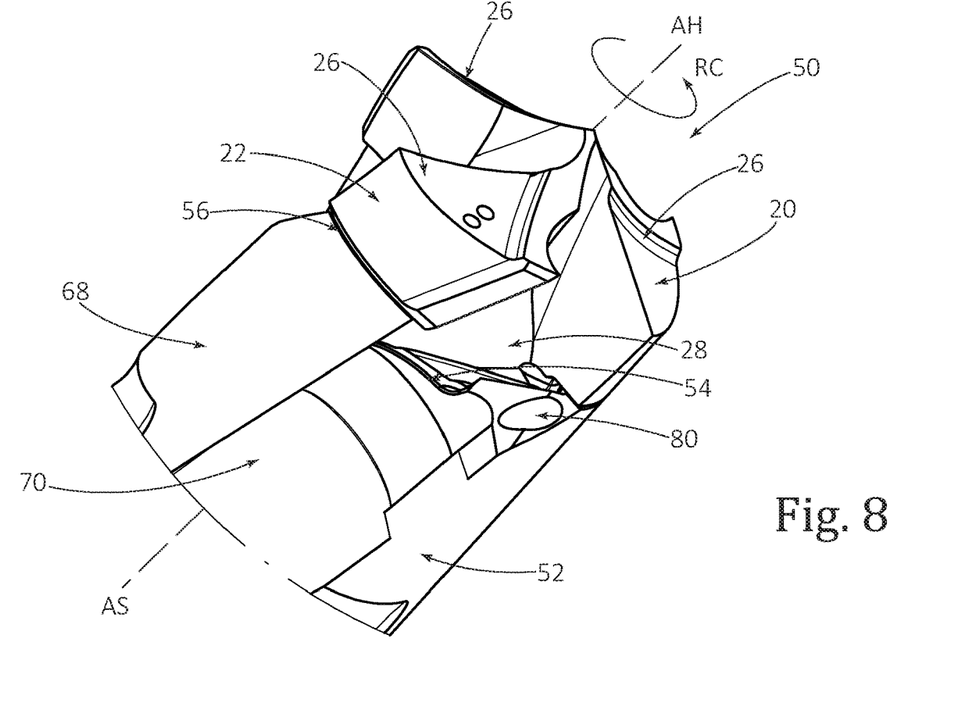
FIG. 8 is a perspective view of a rotary cutting tool in accordance with some embodiments of the present invention.
Figure 11:
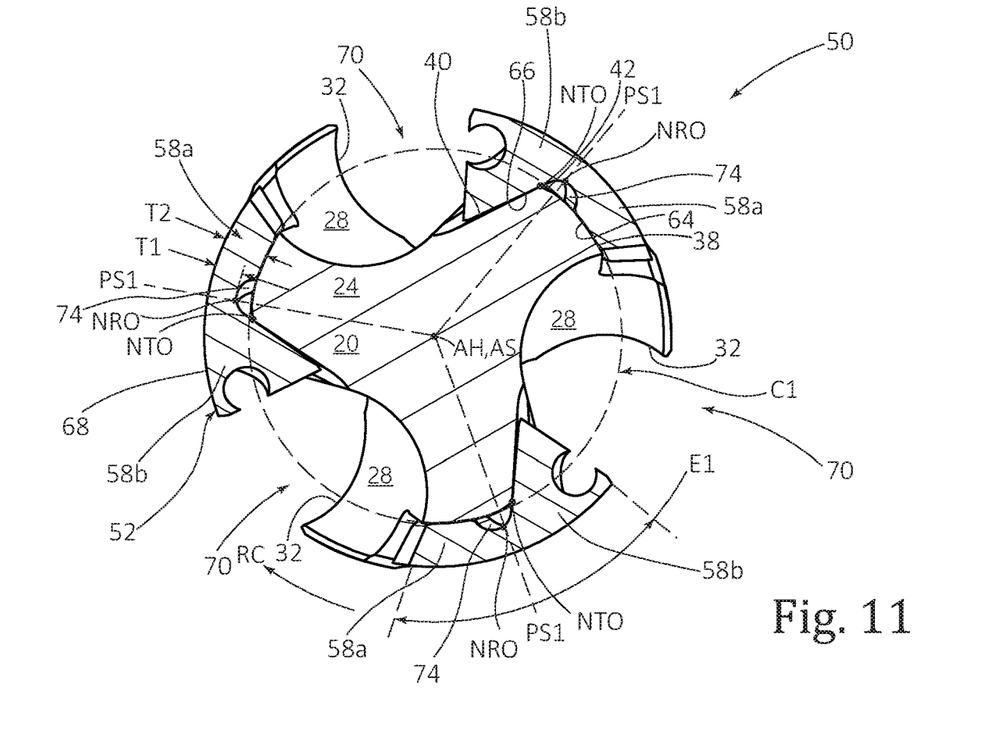
FIG. 11 is a cross-sectional view of the rotary cutting tool shown in FIG. 10, taken along the line XI-XI.

As shown in FIGS. 8, 10 and 11, in the assembled position of the rotary cutting tool 50:
the cap base surface 30 may face the N shank support surfaces 60;
the head axis AH may be coincident with the shank axis AS;
each clamping surface 38 may be in contact with a radially inward facing abutment surface 64 of one of the fixation portions 58; and
each torque transmission surface 40 may be in contact with a drive surface 66 of one of the fixation portions 58, with each drive surface 66 facing in the direction of cutting rotation RC.

As seen in FIGS. 10 and 12, each drive surface 66 extends in a generally radially inward direction from its associated abutment surface 64.

In some embodiments of the present invention, the cap base surface 30 may be in contact with the N shank support surfaces 60.

As shown in FIG. 10, the second height H2 may be greater than the first height H1.

For embodiment of the present invention in which the second height H2 is greater than the first height H1, the cutting head's mounting end surface 36 may be axially spaced apart from the head receiving pocket's bottom surface 62.

It should be appreciated that in the assembled position of the rotary cutting tool 50, apart from the N clamping surfaces 38 being in contact with the N abutment surfaces 64, and the N torque transmission surfaces 40 being in contact with the N drive surfaces 66, no other surfaces of the mounting protuberance 24 may be in contact with the tool shank 52.

As shown in FIG. 11, in a cross-section taken in a first tool plane PT1 coincident with the first head plane PH1, the radially outermost point of contact between each torque transmission surface 40 and its interfacing drive surface 66 may occur at the torque transmission surface's radially outermost torque point NTO.

For such embodiments of the present invention, it should be appreciated that torque transfer between the N drive surfaces 66 and the N torque transmission surfaces 40 is optimized, as the most effective torque transfer occurs at the radially outermost points of contact.

In some embodiments of the present invention, with respect to the direction of cutting rotation RC, each abutment surface 64 may be located rotationally ahead of its associated drive surface 66.

Also, in some embodiments of the present invention, the N abutment surfaces 64 may extend radially inwardly in the axial forward direction DF.

Further, in some embodiments of the present invention, the N abutment surfaces 64 and the N clamping surfaces 38 may be correspondingly inclined in the axial forward direction DF.

For embodiments of the present invention in which the N abutment surfaces 64 and the N clamping surfaces 38 are correspondingly inclined in the axial forward direction DF, clamping forces between the N abutment surfaces 64 and the N clamping surfaces 38 may be directed axially rearwardly as well as radially inwardly.

The present invention also relates to a method of assembling the rotary cutting tool 50 comprising the steps of:
a) orienting the cap base surface 30 to face the N shank support surfaces 60;
b) aligning the head axis AH with the shank axis AS;
c) rotationally aligning the N head flutes 28 with the N fixation portions 58;
d) inserting the mounting protuberance 24 into the head receiving pocket 54; and
e) rotating the cutting head 20 about the head axis AH opposite the direction of cutting rotation RC until:
the N clamping surfaces 38 are retained against the N abutment surfaces 64, and
the N torque transmission surfaces 40 make contact with the N drive surfaces 66.

In some embodiments of the present invention, in step d) of the tool assembly, the mounting protuberance 24 may be inserted into the head receiving pocket 54 until the cap base surface 30 makes contact with the N shank support surfaces 60.

In step e) of the tool assembly, embodiments of the present invention having convexly curved corner surfaces 42 tangentially adjoining the N clamping surfaces 38 may advantageously enable smooth engagement of the N engagement portions 34 with the N fixation portions 58.

It should be appreciated that in step e) of the tool assembly, it may be necessary for the second diameter D2 to be less than one hundred percent of the first diameter D1 for the N clamping surfaces 38 to be successfully retained against the N abutment surfaces 64.

As shown in FIGS. 8 to 12, the tool shank 50 may have a generally cylindrical shank peripheral surface 68.

In some embodiments of the present invention, as shown in FIGS. 11 and 12, the shank peripheral surface 68 may have a shank diameter DS, and the shank diameter DS may be less than the cutting diameter DC.

Also, in some embodiments of the present invention, the second height H2 may be less than thirty percent of the shank diameter DS, i.e. H2<0.30*DS.

As shown in FIGS. 8 to 12, N shank flutes 70 may be formed in the shank peripheral surface 68 and extend along the shank axis AS.

In some embodiments of the present invention, the N shank flutes 70 may extend axially rearwardly from the shank's forward end 56, and the N fixation portions 58 may circumferentially alternate with the N shank flutes 70.

Also, in some embodiments of the present invention, the N shank flutes 70 may helically extend along the shank axis AS.

Further, in some embodiments of the present invention, the N shank flutes 70 may intersect the head receiving pocket's bottom surface 62.

It should be appreciated that in the assembled position of the rotary cutting tool 50, the N shank flutes 70 may at least partially correspond with the N head flutes 28.

As shown in FIG. 11, in the cross-section taken in the first tool plane PT1, each fixation portion 58 subtends a first angular extent E1 about the shank axis AS between its two circumferentially adjacent shank flutes 70.

In some embodiments of the present invention, the first angular extent E1 may be less than eighty degrees, i.e. E1<80°.

Also, in some embodiments of the present invention, the first angular extent E1 may be less than seventy degrees, i.e. E1<70°.

Further, in some embodiments of the present invention, it should be appreciated that the first angular extent E1 is measured around the circumference of the shank peripheral surface 68.

For embodiments of the present invention in which the first angular extent E1 is less than eighty degrees, it should be appreciated that the N shank flutes 70 may have an increased volume, thus advantageously providing increased space for chip evacuation.

As shown in FIGS. 9, 11 and 12, each abutment surface 64 may be circumferentially spaced apart from its associated drive surface 66 by a fixation recess 72 having a recess surface 74.

As shown in FIG. 11, in the cross-section taken in the first tool plane PT1, each recess surface 74 may be located outside the first imaginary circle C1.

It should be appreciated that in the assembled position of the rotary cutting tool 50, each recess surface 74 may be radially spaced apart from one of the cutting head's corner surfaces 42.

Also, as shown in FIG. 11, in the cross-section taken in the first tool plane PT1, each recess surface 74 has a radially outermost recess point NRO.

In some embodiments of the present invention, each radially outermost recess point NRO may be located at least two times further away from the first imaginary circle C1 than each radially outermost torque point NTO.

As shown in FIG. 11, each radially outermost recess point NRO is contained in a first shank plane PS1 containing the shank axis AS, and each fixation portion 58 includes first and second fixation sub-portions 58a, 58b located on opposite sides of its associated first shank plane PS1.

It should be appreciated that in the assembled position of the rotary cutting tool 50, each first shank plane PS1 may intersect one of the cutting head's corner surfaces 42.

In some embodiments of the present invention, each abutment surface 64 may be disposed on one of the first fixation sub-portions 58a, and each drive surface 66 may be disposed on one of the second fixation sub-portions 58b.

As shown in FIG. 11, in the cross-section taken in the first tool plane PT1, for embodiments of the present invention in which the shank peripheral surface 68 is generally cylindrical, a first wall thickness T1 of each fixation portion 58 at its respective fixation recess 72 may be less than a second wall thickness T2 of the fixation portion 58 at its circumferentially adjacent abutment surface 64.

For such embodiments of the present invention, it should be appreciated that each first fixation sub-portion 58a and its respective abutment surface 64 may be resiliently displaceable independently of the second fixation sub-portion 58b.

Also, for such embodiments of the present invention, it should be appreciated the second fixation sub-portion 58b may retain a high level of rigidity, such that torque transfer between each drive surface 66 and its interfacing torque transmission surface 40 can occur with a high level of efficiency and stability.

For embodiments of the present invention in which the second height H2 is less than thirty percent of the shank diameter DS, the provision of a fixation recess 72 at each fixation portion 58 is very effective in providing the associated first fixation sub-portion 58a with an appropriately high level of resilience during the abovementioned step e) of the tool assembly, whilst directing an appropriately high level of clamping force from its respective abutment surface 64 to the interfacing clamping surface 38.

As shown in FIGS. 8 to 12, each fixation portion 58 may include a sloping transition surface 76, and with respect to the direction of cutting rotation RC, each transition surface 76 may be located rotationally behind its associated drive surface 66.

In some embodiments of the present invention, each transition surface 76 may slope opposite the direction of cutting rotation RC in the axial rearward direction DR.

Also, in some embodiments of the present invention, as shown in FIG. 10, each transition surface 76 may intersect its adjacent trailing shank flute 70 axially rearward of the first head plane PH1.

Further, in some embodiments of the present invention, as shown in FIG. 12, each transition surface 76 may intersect its associated shank support surface 60 radially outward of its associated drive surface 66.

As shown in FIGS. 8 to 12, each transition surface 76 may be circumferentially spaced apart from its associated drive surface 66 by an inclined clearance surface 78.

It should be appreciated that for some embodiments of the present invention, the N clearance surfaces 78 may be configured to provide sufficient space for step e) of the tool assembly to be carried out, without inadvertent contact between the N engagement portions 34 and the N fixation portions 58, particularly in the region of the cutting head's N joining surfaces 46.

As shown in FIGS. 8 to 12, the tool shank 52 may include N axially extending coolant passages 80, and each coolant passage 80 may open out to one of the transition surfaces 76.

Although the present invention has been described to a certain degree of particularity, it should be understood that various alterations and modifications could be made without departing from the spirit or scope of the invention as hereinafter claimed.

What is claimed is:

1. A cutting head (20) rotatable about a head axis (AH) in a direction of cutting rotation (RC), the head axis (AH) establishing an axial forward direction (DF) and an axial rearward direction (DR), comprising:

a cap portion (22) having N cutting portions (26) circumferentially alternating with N head flutes (28), and a cap base surface (30) facing in the axial rearward direction (DR); and a mounting protuberance (24) joined to the cap portion (22), extending axially rearwardly from the cap base surface (30), the mounting protuberance (24) having:

a mounting end surface (36) distal from the cap portion (22), facing in the axial rearward direction (DR), and N circumferentially spaced apart engagement portions (34), each engagement portion (34) including a radially outward facing clamping surface (38), and a torque transmission surface (40) facing opposite the direction of cutting rotation (RC), wherein:

N is an integer greater than 1, and in a cross-section taken in a first head plane (PH1) perpendicular to the head axis (AH), intersecting the N engagement portions (34) and passing through the N clamping surfaces (38) and the N torque transmission surfaces (40):

a first imaginary circle (C1) centered about the head axis (AH) and having a first diameter (D1) circumscribes the N clamping surfaces (38), a second imaginary circle (C2) centered about the head axis (AH) and having a second diameter (D2), is defined by N radially outermost torque points (NTO) of the N torque transmission surfaces (40), the second diameter (D2) is greater than ninety percent and less than one hundred percent of the first diameter (D1), and each torque transmission surface (40) extends linearly from its respective radially outermost torque point (NTO) and defines a first imaginary straight line (L1).

2. The cutting head (20) according to claim 1, wherein each first imaginary straight line (L1) passes through another portion of the mounting protuberance (24).

3. The cutting head (20) according to claim 1, wherein: N equals 3, and in the cross-section taken in the first head plane (PH1), the N torque transmission surfaces (40) define an imaginary torque triangle (TT).

4. The cutting head (20) according to claim 3, wherein: the N torque transmission surfaces (40) are outwardly inclined in the axial forward direction (DF), such that in the cross-section taken in the first head plane (PH1), the portions of the N torque transmission surfaces (40) axially forward of the first head plane (PH1) are located outside the torque triangle (TT).

5. The cutting head (20) according to claim 1, wherein: the N head flutes (28) extend axially rearwardly from the cap portion (22) and intersect the mounting end surface (36), and the N engagement portions (34) circumferentially alternate with the N head flutes (28).

6. The cutting head (20) according to claim 1, wherein in the cross-section taken in the first head plane (PH1), each clamping surface (38) lies on the first imaginary circle (C1).

7. The cutting head (20) according to claim 1, wherein: each cutting portion (26) has a radially extending cutting edge (32), N radially outermost cutting points (NCO) of the N radially extending cutting edges (32) define an imaginary cutting circle (CC) centered about the head axis (AH) and having a cutting diameter (DC), and the first diameter (D1) is greater than seventy percent of the cutting diameter (DC).

8. The cutting head (20) according to claim 7, wherein: the mounting end surface (36) is axially spaced apart from the cap base surface (30) by a first height (H1), and the first height (H1) is less than thirty percent of the cutting diameter (DC).

9. The cutting head (20) according to claim 1, wherein the N clamping surfaces (38) taper in the axial forward direction (DF).

10. The cutting head (20) according to claim 1, wherein: each torque transmission surface (40) is formed in a torque cut-out (44) of its respective engagement portion (34), each torque transmission surface (40) intersects an adjacent joining surface (46) to form a straight torque border edge (48), and each torque border edge (48) defines a second imaginary straight line (L2) which does not intersect or pass through any other portion of the mounting protuberance (24).

11. The cutting head (20) according to claim 10, wherein apart from each second imaginary second straight line (L2) being coincident with its respective torque border edge (48), each second imaginary straight line (L2) does not intersect or pass through any other portion of the cutting head (20).

12. The cutting head (20) according to claim 10, wherein each torque border edge (48) intersects the first head plane (PH1).

13. The cutting head (20) according to claim 10, wherein: each torque transmission surface (40) defines a third head plane (PH3), and each third head plane (PH3) intersects the mounting protuberance (24) along its associated torque border edge (48).

14. A rotary cutting tool (50) comprising, in combination: a tool shank (52) extending along a shank axis (AS) and having a head receiving pocket (54) at a forward end (56) thereof, the head receiving pocket (54) comprising circumferentially spaced apart fixation portions (58), each fixation portion (58) having an axially forward-facing shank support surface (60), and a cutting head (20) rotatable about a head axis (AH) in a direction of cutting rotation (RC), the head axis (AH) establishing an axial forward direction (DF) and an axial rearward direction (DR), the cutting head comprising:

a cap portion (22) having N cutting portions (26) circumferentially alternating with N head flutes (28), and a cap base surface (30) facing in the axial rearward direction (DR); and a mounting protuberance (24) joined to the cap portion (22), extending axially rearwardly from the cap base surface (30), the mounting protuberance (24) having:

a mounting end surface (36) distal from the cap portion (22), facing in the axial rearward direction (DR), and N circumferentially spaced apart engagement portions (34), each engagement portion (34) including a radially outward facing clamping surface (38), and a torque transmission surface (40) facing opposite the direction of cutting rotation (RC), wherein:

N is an integer greater than 1;

in a cross-section taken in a first head plane (PH1) perpendicular to the head axis (AH), intersecting the N engagement portions (34) and passing through the N clamping surfaces (38) and the N torque transmission surfaces (40):

a first imaginary circle (C1) centered about the head axis (AH) and having a first diameter (D1) circumscribes the N clamping surfaces (38), a second imaginary circle (C2) centered about the head axis (AH) and having a second diameter (D2), is defined by N radially outermost torque points (NTO) of the N torque transmission surfaces (40), and the second diameter (D2) is greater than ninety percent and less than one hundred percent of the first diameter (D1); and in an assembled position of the tool:

the cutting head (20) is releasably secured to the head receiving pocket (54);

the cap base surface (30) faces the N shank support surfaces (60);

the head axis (AH) is coincident with the shank axis (AS);

each clamping surface (38) is in contact with a radially inward facing abutment surface (64) of one of the fixation portions (58);

each torque transmission surface (40) is in contact with a drive surface (66) of one of the fixation portions (58), each drive surface (66) facing in the direction of cutting rotation (RC);

each abutment surface (64) is circumferentially spaced apart from its associated drive surface (66) by a fixation recess (72) having a recess surface (74), and in a cross-section taken in a first tool plane (PT1) coincident with the first head plane (PH1), each recess surface (74) is located outside the first imaginary circle (C1).

15. The rotary cutting tool (50) according to claim 14, wherein:

the N clamping surfaces (38) and the N abutment surfaces (64) are inclined in the axial forward direction (DF).

16. The rotary cutting tool (50) according to claim 14, wherein in a cross-section taken in a first tool plane (PT1) coincident with the first head plane (PH1), the radially outermost point of contact between each torque transmission surface (40) and its interfacing drive surface (66) occurs at the torque transmission surface's radially outermost torque point (NTO).

17. The rotary cutting tool (50) according to claim 14, wherein the tool shank (52) has a generally cylindrical shank peripheral surface (68), and N shank flutes (70) are formed in the shank peripheral surface (68) and extend along the shank axis (AS).

18. The rotary cutting tool (50) according to claim 17, wherein:

the N shank flutes (70) extend axially rearwardly from the shank's forward end (56), and the N fixation portions (58) circumferentially alternate with the N shank flutes (70).

19. The rotary cutting tool (50) according to claim 18, wherein, in a cross-section taken in a first tool plane (PT1) coincident with the first head plane (PH1):

each fixation portion (58) subtends a first angular extent (E1) about the shank axis (AS) between its two circumferentially adjacent shank flutes (70), and the first angular extent (E1) is less than eighty degrees.

20. The rotary cutting tool (50) according to claim 14, wherein, in the cross-section taken in the first tool plane (PT1):

each recess surface (74) has a radially outermost recess point (NRO), and each radially outermost recess point (NRO) is located at least two times further away from the first imaginary circle (C1) than each radially outermost torque point (NTO).

21. A cutting head (20) rotatable about a head axis (AH) in a direction of cutting rotation (RC), the head axis (AH) establishing an axial forward direction (DF) and an axial rearward direction (DR), comprising:

a cap portion (22) having N cutting portions (26) circumferentially alternating with N head flutes (28), and a cap base surface (30) facing in the axial rearward direction (DR); and a mounting protuberance (24) joined to the cap portion (22), extending axially rearwardly from the cap base surface (30), the mounting protuberance (24) having:

a mounting end surface (36) distal from the cap portion (22), facing in the axial rearward direction (DR), and N circumferentially spaced apart engagement portions (34), each engagement portion (34) including a radially outward facing clamping surface (38), and a torque transmission surface (40) facing opposite the direction of cutting rotation (RC), wherein:

N is an integer equal to 3; and in a cross-section taken in a first head plane (PH1) perpendicular to the head axis (AH), intersecting the N engagement portions (34) and passing through the N clamping surfaces (38) and the N torque transmission surfaces (40):

a first imaginary circle (C1) centered about the head axis (AH) and having a first diameter (D1) circumscribes the N clamping surfaces (38), a second imaginary circle (C2) centered about the head axis (AH) and having a second diameter (D2), is defined by N radially outermost torque points (NTO) of the N torque transmission surfaces (40), the second diameter (D2) is greater than ninety percent and less than one hundred percent of the first diameter (D1), and the N torque transmission surfaces (40) define an imaginary torque triangle (TT).

* * * * *